(12) United States Patent
Nagel et al.

(10) Patent No.: US 12,291,439 B2
(45) Date of Patent: May 6, 2025

(54) DRIVERLESS TRANSPORT DEVICE AND DRIVERLESS TRANSPORT SYSTEM FOR TRANSPORTING OBJECTS, AND METHOD FOR OPERATING A DRIVER-LESS TRANSPORT DEVICE AND A DRIVERLESS TRANSPORT SYSTEM FOR TRANSPORTING OBJECTS

(71) Applicants: IMS GEAR SE & CO. KGAA, Donaueschingen (DE); ANTRIMON (DEUTSCHLAND) GMBH, Aldingen (DE)

(72) Inventors: Benedikt Nagel, Brigachtal (DE); Fabian Gruler, Aixheim (DE); Matthias Koop, Neufahrn b. Freising (DE); Michael Rosen, Bad Dürrheim (DE); Simon Schwörer, Brigachtal (DE); Yannik Abelmann, Tennenbronn-Schramberg (DE); Yvonne Fürderer, Furtwangen (DE); Christof Klaiber, Villingen-Schwenningen (DE); Matthias Huber, Gutmadingen (DE)

(73) Assignees: IMS GEAR SE & CO. KGAA, Donaueschingen (DE); ANTRIMON (DEUTSCHLAND) GMBH, Aldingen (DE)

( * ) Notice: Subject to any disclaimer, the term of this patent is extended or adjusted under 35 U.S.C. 154(b) by 297 days.

(21) Appl. No.: 17/772,290

(22) PCT Filed: Jul. 6, 2020

(86) PCT No.: PCT/EP2020/068952
§ 371 (c)(1),
(2) Date: Apr. 27, 2022

(87) PCT Pub. No.: WO2021/083561
PCT Pub. Date: May 6, 2021

(65) Prior Publication Data
US 2022/0380187 A1 Dec. 1, 2022

(30) Foreign Application Priority Data
Oct. 29, 2019 (EP) .................................. 19205967

(51) Int. Cl.
*B66F 9/06* (2006.01)
*B66F 9/075* (2006.01)

(52) U.S. Cl.
CPC .......... *B66F 9/063* (2013.01); *B66F 9/07504* (2013.01); *B66F 9/0755* (2013.01); *B66F 9/07559* (2013.01); *B66F 9/07572* (2013.01)

(58) Field of Classification Search
CPC .............................. B66F 9/063; B66F 9/0755
See application file for complete search history.

(56) References Cited

U.S. PATENT DOCUMENTS 9,073,736 B1 * 7/2015 Hussain ................. G05D 1/667
10,106,383 B2 * 10/2018 Shen ..................... B66F 7/0625
(Continued)

FOREIGN PATENT DOCUMENTS

CN 107250004 A 10/2017
DE 102013020833 A1 6/2015
(Continued)

OTHER PUBLICATIONS

Office action issued Nov. 27, 2023, in parallel pending Chinese patent application No. 202080075247.3; translation attached.
(Continued)

*Primary Examiner* — Jonathan Snelting
(74) *Attorney, Agent, or Firm* — Nath, Goldberg & Meyer; Jerald L. Meyer; Morgan D. Rosenberg

(57) ABSTRACT

The present invention relates to a driverless transport device (10) for transporting objects (38), comprising: a support structure (12) having an outer contour (14); an undercarriage (16) which is secured to the support structure (12) and has
(Continued)

at least one first wheel (18) and a second wheel (20), wherein the first wheel (18) is mounted in the undercarriage (16) so as to rotate about a first axis of rotation (D1) and the second wheel (20) is mounted in the undercarriage (16) so as to rotate about a second axis of rotation (D2); a drive unit (22) by means of which the first wheel (18) and the second wheel (20) can be driven independently of each other; and a force measuring device (56) by means of which the force acting on the support portion (39) can be determined.

13 Claims, 7 Drawing Sheets

(56) References Cited

U.S. PATENT DOCUMENTS

| | | | | |
|---|---|---|---|---|
| 10,328,836 | B2* | 6/2019 | Purwin | B25J 5/007 |
| 10,343,881 | B2* | 7/2019 | Guo | B25J 9/047 |
| 10,434,924 | B2* | 10/2019 | Alfaro | B60K 7/0007 |
| 11,167,923 | B2* | 11/2021 | Sabhnani | B65G 1/10 |
| 11,370,643 | B2* | 6/2022 | Hasegawa | B66F 9/10 |
| 2016/0236867 | A1* | 8/2016 | Brazeau | B25J 5/007 |
| 2016/0288687 | A1 | 10/2016 | Scherle et al. | |
| 2017/0144873 | A1 | 5/2017 | Colantonio | |

FOREIGN PATENT DOCUMENTS

| | | |
|---|---|---|
| DE | 202014000755 U1 | 6/2015 |
| DE | 102016107451 A1 | 10/2016 |
| EP | 3256290 B1 | 4/2020 |
| WO | 2016/130338 A1 | 8/2016 |

OTHER PUBLICATIONS

Search Report issued May 15, 2020, for corresponding application EP 19205967.3.

* cited by examiner

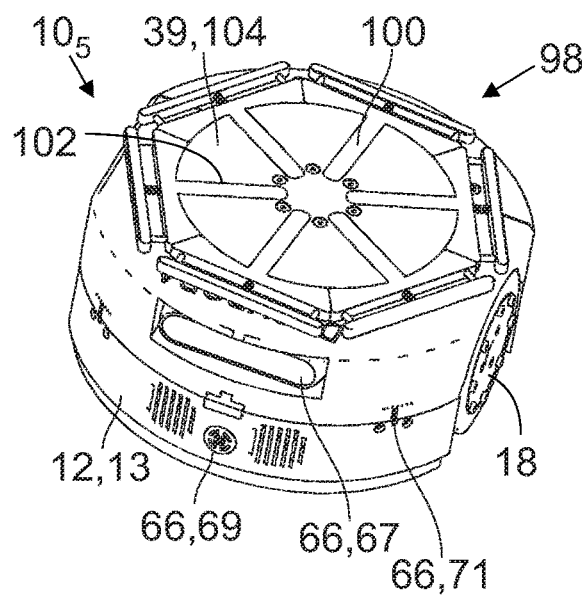
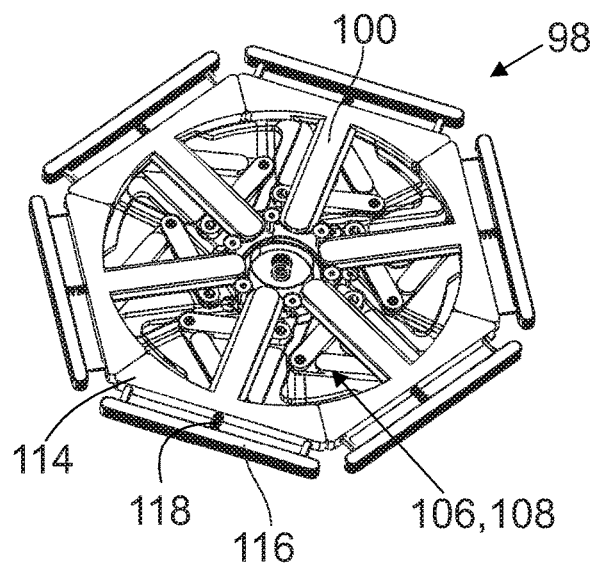
Fig.7A         Fig.7B
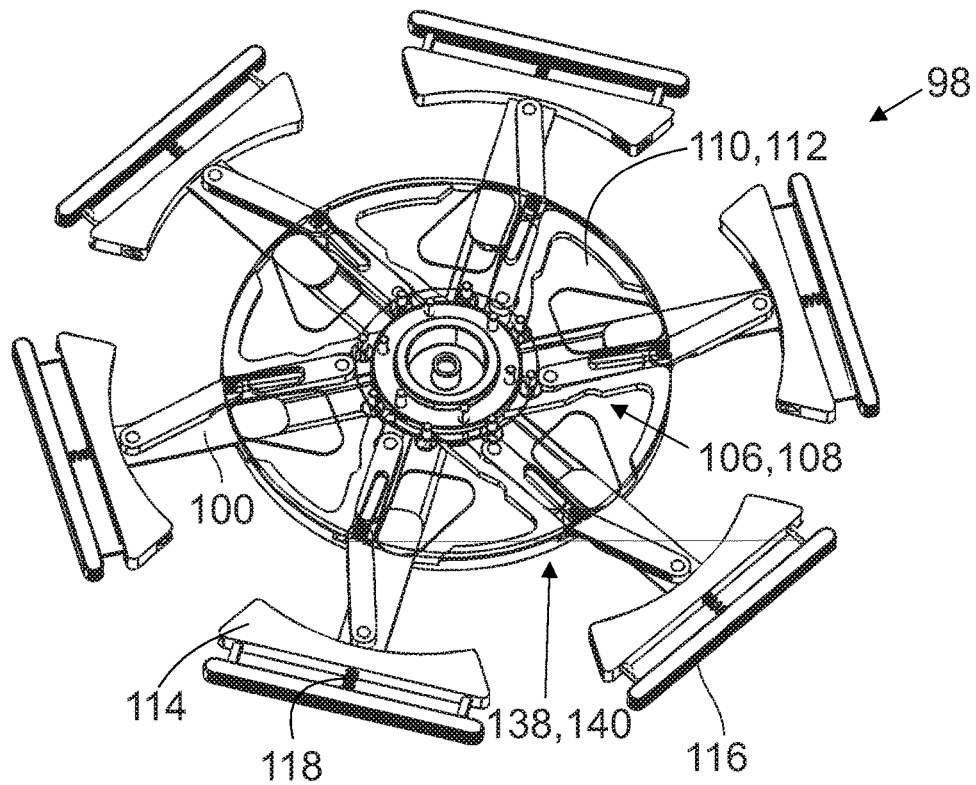
Fig.7C

DRIVERLESS TRANSPORT DEVICE AND DRIVERLESS TRANSPORT SYSTEM FOR TRANSPORTING OBJECTS, AND METHOD FOR OPERATING A DRIVER-LESS TRANSPORT DEVICE AND A DRIVERLESS TRANSPORT SYSTEM FOR TRANSPORTING OBJECTS

This is a National Phase Application filed under 35 U.S.C. 371 as a national stage of PCT/EP2020/068952, filed Jul. 6, 2020, an application claiming the benefit of European Application No. 19205967.3 filed Oct. 29, 2019, the content of each of which is hereby incorporated by reference in its entirety.

The present invention relates to a driverless transport device and a driverless transport system for transporting objects. The invention also relates to a method for operating a driverless transport device and a driverless transport system for transporting objects.

As the digitalization of industrial processes advances, the transport of objects is also being carried out with increasing levels of automation. For this purpose, so-called driverless transport devices and automated transport systems (ATS) are used; these are also referred to as "automated guided vehicles" (AGV). In driverless transport systems, a plurality of driverless transport devices are combined and operated like a swarm. Driverless transport systems are used in particular in logistics and in manufacturing, where various objects, for example semi-finished products or other components, have to be transported from a first location to a second location. For example, trucks can be loaded and unloaded automatically.

In many cases, the objects are transported using load carriers, such as crates, boxes, or pallets. DE 10 2013 017 062 A1 discloses a driverless transport system which has two conveying runners which can be introduced into the elongate cavities in a pallet in the manner of a fork of a forklift. The conveying runners have a lifting device by means of which the pallet can be lifted slightly from the ground and then transported to the desired location where it can be lowered again.

Due to the fact that the conveying runners have a significantly greater extent in the longitudinal direction compared to the transverse direction, the maneuverability is limited in particular in that there must be sufficient space in front of the pallet to be able to align the conveying runners with the cavities. The device disclosed in EP 2 765 101 A1 also has a similar extent to that of the above-mentioned conveying runners, which means that here too there is limited maneuverability.

A further driverless transport system is described in DE 10 2013 101 561 A1 and DE 20 2014 104 780 U1; this system uses reference marks which indicate the path along which the driverless transport system can be moved. This results in limited flexibility since it is not possible to use the system outside the reference marks. In addition, laying the reference marks requires a not inconsiderable effort.

It is the object of an embodiment of the present invention to propose a driverless transport device for transporting objects, which device can be easily integrated into existing transport processes and which provides good maneuverability and additional functions that have not yet been made available. Furthermore, one design of the present invention is based on the object of creating a method by means of which the driverless transport device can be operated with the provision of additional functions.

Moreover, one embodiment of the invention is based on the object of creating a driverless transport system and a method by means of which a plurality of driverless transport devices can be operated with the provision of additional functions.

This object is achieved with the features specified in claims 1, 9, 12, and 15. Advantageous embodiments are the subject of the dependent claims.

One embodiment of the invention relates to a driverless transport device for transporting objects, comprising:
  a support structure having an outer contour;
  an undercarriage which is secured to the support structure and has at least one first wheel and a second wheel, wherein the first wheel is mounted in the undercarriage so as to rotate about a first axis of rotation and the second wheel is mounted in the undercarriage so as to rotate about a second axis of rotation;
  a drive unit by means of which the first wheel and the second wheel can be driven independently of each other; and
  a force measuring device by means of which the force acting on the support portion can be determined.

The objects that can be transported by means of the driverless transport device are, in particular, load carriers such as pallets, crates, or boxes on or in which goods and products are stored. However, other objects can also be transported using corresponding adapters with the driverless transport device, for example prams, hospital beds, or garbage cans.

Due to the fact that the first wheel and the second wheel can be driven independently of each other, the driverless transport device can be rotated with a very small radius or even on the spot, as a result of which the maneuverability of the driverless transport device and the transported object is significantly increased compared to known transport devices.

Since, in this embodiment, the driverless transport device has a force measuring device which can determine the force acting on the support portion interacting with the object, it is possible to prevent the driverless transport device from being overloaded and becoming damaged as a result. In addition, the weight of the transported object can be determined. This allows for different areas of application. As mentioned at the outset, garbage cans, inter alia, can also be transported by means of the driverless transport device. Being able to determine the weight of the garbage can in question makes it possible to calculate consumption-based garbage collection charges. As likewise mentioned, the driverless transport device can also be used to load trucks. It is also possible to prevent the trucks from being overloaded. In addition, the load area of the truck can be loaded as evenly as possible. This makes it possible, in particular, to reduce the skid risk to trucks during transit, thus contributing to traffic safety.

According to a further developed embodiment, the force measuring device has at least one force sensor which is designed as a capacitive force sensor, a resistive force sensor, as a strain gauge, or as a printed electronics system. Such force sensors are small, can be easily integrated into electronic open- or closed-loop control circuits, and are also available at low cost.

According to a further embodiment, the force measuring device has two or more than two force sensors. The force sensors used here determine the force acting thereon on the basis of a distance by which the force sensors have been deformed as a result of the force exerted. A force sensor as such can therefore only return a value which is in a specific proportion to the degree of deformation. However, a force sensor cannot provide any information about the type and distribution of the load. However, if at least two force sensors are connected, for example, to a plate on which the force acts, further information about the type of load can be generated. For example, using two force sensors, it is possible to detect a thrust acting on the plate along a plane and a tilting of the plate about an axis. With three force sensors, it is possible, depending on the mechanical bearing, to measure a thrust acting in two planes, a rotation about an axis of rotation and a tilting about two axes. As the number of force sensors increases, the type of load can be detected more and more accurately. However, the relevant loads occurring during operation of the transport device can be determined with sufficient accuracy using three force sensors.

In a further embodiment, the force measuring device has at least two force sensors, at least one force sensor being assigned to a first group and at least one force sensor being assigned to a second group, and the force sensors of the first group being arranged perpendicularly to the force sensors of the second groups. Due to the fact that at least two force sensors are arranged perpendicularly to one another, thrust forces in particular can be determined easily in a small installation space.

In accordance with a further embodiment, the driverless transport device comprises a lifting device which interacts with the support structure for lifting and lowering at least one support portion which interacts with the objects in order to transport same. In principle, it is possible to place the object to be transported onto the driverless transport device, for example by means of a crane or a forklift, in order to subsequently move the object to the desired destination. In this case, however, it is necessary to lift the object to be transported in order to remove it from the ground. However, the driverless transport device can also be used for moving objects which themselves have rollers, for example hospital beds or garbage cans. These objects do not necessarily have to be lifted in order to be movable.

By means of the lifting device, however, it is possible to drive the driverless transport device into a corresponding recess in the object to be transported, for example into the above-mentioned elongate cavity in the pallet, while the pallet is still on the ground. When the driverless transport device is in the desired position, the lifting device is activated, thereby lifting the pallet from the ground. The expanding device is then activated so that the driverless transport device can align itself with the pallet. In addition, the driverless transport device is frictionally connected to the pallet. As a result, the pallet can be prevented from slipping out of position relative to the driverless transport device. This can be relevant in particular if the pallet is to be transported along an inclined surface. It is therefore also possible to transport objects without them being lifted beforehand and placed on the driverless transport device. In addition, it is likewise possible to transport objects which themselves have no rollers or the like and therefore cannot be pulled.

According to a further embodiment, the outer contour of the support structure is substantially rotationally symmetrical about an axis of rotation in the top view, wherein the support portion and/or the first wheel and the second wheel are arranged within the outer contour or are flush with the outer contour. The first and the second axis of rotation usually extend substantially in parallel with a surface on which the first wheel and the second wheel roll. This surface is, for example, the load area of a truck or the floor of a workshop. When the driverless transport device is used as intended, in particular when said device is traveling continuously on the surface, the rotational axis is intended to extend substantially perpendicularly to the surface. The outer contour is to be understood to mean the outer edge of the support structure, it being possible for the outer edge of the support structure to also be formed by a housing.

Due to the fact that the outer contour is rotationally symmetrical with respect to the rotational axis, and the support portion and/or the first wheel and the second wheel are arranged within the outer contour, the driverless transport device according to this embodiment has no eccentric portions. If, for example, the driverless transport device is located in the elongate cavities in a pallet and is to rotate on the spot, it is ensured that a rotation of 360° is possible without any eccentric portions of the driverless transport device striking the pallet.

In a further embodiment, the transport device can have a sensor unit for detecting the environment of the transport device, wherein the sensor unit is arranged in a sensor portion delimited by the outer contour and the first axis of rotation or the second axis of rotation, and the sensor unit is designed in such a way that it only detects the part of the environment on the side of the first axis of rotation or the second axis of rotation on which the sensor unit is arranged.

Driverless transport devices known from the prior art have sensor units which can detect the immediate environment. For example, obstacles can be identified and appropriate countermeasures initiated. Depending on the type of obstacle, it can be driven around or the driverless transport device can be stopped. Since driverless transport devices pose a not inconsiderable risk to nearby persons, and, in order to enable smooth operation, the environment must be monitored continuously. Consequently, the sensor unit has to be able to detect the environment through 360°. The sensor system required for this is relatively complex.

In this embodiment, the sensor unit is arranged in such a way that it can detect a maximum of 180° of the environment. In particular, due to the possibility of making the outer contour rotationally symmetrical and of being able to rotate the driverless transport device more or less on the spot, reversing is not necessary. Therefore, it is sufficient to detect only 180° of the environment. The sensor unit is arranged in such a way that the environment in front of the driverless transport device in the direction of travel is detected. As a result, the sensor unit can be constructed in a much simpler manner and the corresponding driverless transport device can be provided at a more favorable cost.

The sensor portion should, by definition, be the portion of the driverless transport devices between the axis of rotation and the outer contour. In the event that the driverless transport device has a plurality of axes of rotation, the sensor portion should be the portion that covers the smallest area perpendicularly to the rotational axis or in the top view.

In a further embodiment, the transport device can have a storage unit for electrical energy which, in the top view, protrudes in portions beyond the outer contour of the support structure, the storage unit being movably secured to the support structure.

Again, the top view relates to the intended use, in which the first wheel and the second wheel roll on a surface. In the top view one therefore looks along the abovementioned rotational axis. Depending on the embodiment, the outer contour can be designed rotationally symmetrically with respect to the rotational axis, so that when the driverless transport device rotates about the rotational axis, no eccentric portions can strike, for example, the walls of the cavities in a pallet. The storage unit for electrical energy, which is required, for example, for driving the wheels and for operating the sensor unit, protrudes in portions beyond the outer contour of the support structure, such that the storage unit forms an eccentric portion. As a result, the space enclosed by the storage unit and its charge capacity can be increased. However, there is a risk that the storage unit will strike adjacent objects during rotation, for example the abovementioned walls of the cavities in a pallet. However, the storage unit is movably attacked to the supporting structure so that when it strikes the walls of the cavities in a pallet, for example, it does not impair the further rotation of the driverless transport device. Consequently, in this embodiment, the charge capacity of the storage unit can be increased without restricting the maneuverability of the driverless transport device.

In a further embodiment, the storage unit can be secured to the support structure so as to rotate about the rotational axis. In particular, if the outer contour of the support structure is designed rotationally symmetrically with respect to the rotational axis, it is also appropriate to secure the storage unit to the support structure so as to rotate about the rotational axis. For this purpose, an annular groove can be provided, into which the storage unit engages interlockingly with a correspondingly designed projection. In particular, if the driverless transport device is to rotate on the spot and the storage unit strikes an adjacent object, the rotation is not impeded.

A further embodiment is characterized in that the storage unit is arranged outside the sensor portion. As already mentioned, the storage unit can be movably secured to the support structure. However, in order to prevent the storage unit from being placed in a position in which it impairs the functioning of the sensor, the mobility can be restricted. This can be brought about, for example, by the fact that the abovementioned annular groove does not protrude into the sensor portion. In this way, flawless functionality of the sensor is ensured despite the storage unit being movably secured to the support structure.

In accordance with a further embodiment, the storage unit is detachably secured to the support structure. Securing the storage unit to the support structure detachably allows the charging process to be simplified. In particular, an empty storage unit can be exchanged for a full storage unit within a short period of time. The empty storage unit can be charged during the time in which the full storage unit is ensuring the operation of the driverless transport device. The process of exchanging an empty storage unit for a full storage unit can be automated, so that the exchange can take place in good time and, in addition, with only a short operational interruption and without the aid of a user.

A further embodiment is characterized in that the transport device has at least one support wheel and/or a bristle portion. In principle, the number of wheels that is mounted in the undercarriage can be freely selected. For example, it is possible to provide three or four wheels so that the transport device cannot tip over. However, the technical complexity is kept low and the maneuverability is increased if only two wheels are provided. In this case, however, the driverless transport device can tip over in such a way that part of the support structure rests on the surface and is dragged over it. In order to prevent such a tipping motion, a support wheel and/or a bristle portion can be provided. The support wheel should differ from the wheels in that it is not driven, but can in particular rotate about an axis of rotation that extends in parallel with the rotational axis, and can therefore be steered together with the wheels. It is self-evident that a plurality of such support wheels can also be provided.

The bristle portion can be provided with a number of appropriately resilient bristles. Providing a bristle portion likewise has the effect of preventing the device from tipping over and being dragged. In addition, the bristles act like a broom and remove at least relatively small obstacles such as dirt particles from the environment in front of the transport device in the direction of travel. These obstacles therefore do not have a disruptive effect on the rolling of the wheels on the surface.

In accordance with a further embodiment, all the wheels can be arranged so as to rotate about a common axis of rotation and the driverless transport device can have a self-stabilizing device. In this embodiment, the transport device can rotate about the common axis of rotation, so that the device can tilt about said axis in the event of a load that is not exactly even. As a result, the support structure, as already mentioned, can drag over the surface. In this embodiment, the driverless transport device has a self-stabilizing device which can comprise, for example, a tilt sensor or a gyroscope. If it is determined that the driverless transport device is rotating about the common axis of rotation and there is a risk of the support structure coming into contact with the surface, stabilizing countermeasures can be taken in order to reduce the inclination of the driverless transport device to a non-critical level. This can be done, for example, by controlling the drive unit so that the wheels rotate in such a way that a torque that counteracts the tipping motion can be generated. In addition, it is possible to provide counterbalancing weights or counterbalancing shafts which can be shifted within the support structure depending on the inclination, thus allowing a torque to be generated that counteracts the tilting motion.

In a further embodiment, the transport device can have a signal generator for outputting a warning signal. The warning signal can be output in particular in optical and/or acoustic form. The warning signal can be output in various cases, for example if the driverless transport device is defective, an unexpected obstacle is detected which cannot be overcome, or if it is determined that the object to be transported is too heavy and the driverless transport device would be overloaded as a result.

In a further embodiment, the transport device can have a carrying handle to allow the transport device to be gripped. Depending on the design of the transport device, it can be less than 10 kg in weight and therefore able to be carried by a user, as a result of which the transport device can be transported flexibly from one location to another, without having to travel the path itself. Carrying is facilitated by the carrying handle.

One design of the invention relates to a method for operating a driverless transport device according to one of the above-mentioned embodiments, comprising the following steps:
   detecting the environment of the transport device with respect to selectable properties by means of a sensor unit, and
   lifting or lowering the support portion by means of the lifting device on the basis of the detected properties of the environment.

One of the selectable properties can be the evenness of the surface on which the transport device is traveling. In the event that the sensor unit detects unevenness, for example in the form of bumps, which could lead to the transported objects slipping or falling from the transport device during travel, the support portion can be lifted or lowered accordingly. In this way, shocks and vibrations acting on the transported objects are kept low and the objects are protected.

In a further design, the method comprises the following steps:
defining a load area which is to be loaded with a plurality of objects by means of the driverless transport device;
transporting a first object onto the load area;
determining the first force acting on the support portion by means of the force measuring device;
placing the first object at a first position of the load area;
transporting a second object onto the load area;
determining the second force acting on the support portion by means of the force measuring device; and
placing the second object at a second position of the load area, wherein the second position is selected on the basis of the first force and the second force in such a way that the load area is loaded evenly.

As mentioned, the transport device can be designed in such a way that it can determine the weight of the transported object or objects. If a load area, for example the load area of a truck, is to be loaded, the transport device can be operated in such a way that the load area is loaded as evenly as possible. To this end, the positions where the objects are placed on the load area are selected on the basis of the weight of the objects in question. An even load contributes to the traffic safety of the truck in question and in particular reduces the risk of skidding. This also applies to the loading of other means of transport such as ships and aircraft.

A further developed design of the method provides the following step:
changing the first position and/or the second position in order to even out the loading of the load area.

Since the weight of the objects which are to be placed on the load area is not necessarily known from the outset, it may be possible to change the positions once chosen in order to even out the loading of the load area. The method according to this design can be carried out, for example, such that the load area is initially loaded to such an extent that all objects which are to be transported by truck, for example, are placed on the load area thereof. The driverless transport device stores the position and the weight of the objects which are placed on the load area. After the loading has been completed, the driverless transport device then changes the positions of the corresponding objects within the load area in such a way that the area is loaded as evenly as possible, if this should be necessary.

In accordance with a further developed design, the method comprises the following steps:
defining a maximum load for the load area, and
outputting a warning signal by means of the signal generator when the defined maximum load is reached or exceeded.

In this design of the method, the transport device outputs a warning signal when the maximum load is reached or exceeded. Alternatively or additionally, the transport device can discontinue the further loading of the load area. This prevents overloading of the load area.

One embodiment of the invention relates to a driverless transport system, comprising
a plurality of driverless transport devices according to one of the previous embodiments;
a control unit for controlling or regulating the driverless transport devices; and
a communication device by means of which information can be exchanged between the control unit and the driverless transport devices.

The driverless transport system comprises a plurality of driverless transport devices, the number of which can be selected as desired. The minimum number should be two. Depending on the objects to be transported, the most suitable number of transport devices is three or four. However, the transport system can also comprise a plurality of subgroups of, for example, four transport devices in each subgroup, wherein the number of transport devices of the subgroups does not have to be equal.

In order to be able to transport objects using a plurality of driverless transport devices, the devices must be coordinated, for which purpose the control unit is used. In addition, information must be exchanged between the control unit and the driverless transport devices in order to be able to implement the coordination, for which purpose the communication device is used. The communication device can use a wireless network, for example a WLAN network, a Bluetooth network or the like. For this purpose, each of the transport devices and the control unit have a transmitter-receiver unit. This transmitter-receiver unit can also be used in the manner of a relay station and can be operated as a repeater in order to maintain the stability of the WLAN network. In particular, if some of the transport devices are located behind goods, the WLAN network may not be sufficient. The repeater function strengthens the WLAN network even in areas with a weak WLAN network.

The tasks to be performed by the driverless transport system can be defined in the control unit. In particular, the objects that are to be transported can be identified. In addition, the current location and the destination location of the objects to be transported can be defined.

In a further embodiment, at least one of the driverless transport devices can be designed as a master and the other driverless transport devices can be designed as slaves, the master can have a master sensor unit for detecting the environment of the master, and the master transmits information relating to the environment of the master to the control unit and/or to the slaves.

The master differs from the slaves in that only the master has the master sensor unit. The slaves either have no sensor unit at all or have only a much simpler sensor unit. The master sensor unit is designed in such a way that it can be used to detect not only the immediate environment of the master itself, but also the environment of all the slaves. In this respect, the master sensor unit must be designed to be correspondingly powerful. Due to the fact that the slaves do not have to have a sensor unit or have only a much simpler sensor unit, the outlay with respect to the sensor units used can be reduced. The more slaves that are used, the greater the achievable advantage. The master can also be equipped with a particularly powerful communication device in order to ensure adequate network coverage, for example within the workshop. The master can be positioned in such a way that the network, for example the WLAN network, can be strengthened particularly effectively, so as to ensure an exchange of information with all the slaves. The master can constantly adjust its position to the strength of the network and the position of the slaves.

A further embodiment is characterized in that
each of the transport devices has a sensor unit for detecting the environment of the transport device,
the sensor unit being arranged in a sensor portion delimited by the outer contour and the first axis of rotation or the second axis of rotation, and the sensor unit is designed in such a way that it only detects the part of the environment on the side of the first axis of rotation or the second axis of rotation on which the sensor unit is arranged, at least a first of the sensor units being oriented in a first direction and at least a second of the sensor units being oriented in a second direction.

In this embodiment, all the driverless transport devices interconnected to form a transport system have the same sensor units. If, for example, two transport devices are interconnected to form a transport system, the sensor unit of the first transport device can be oriented to the front (first direction) in the direction of travel and the sensor unit of the second transport device oriented to the rear (second direction). In this respect, the environment of the driverless transport system can be monitored to a sufficient extent without having to use particularly powerful sensor units.

One implementation of the present invention relates to a method for operating a driverless transport system according to one of the previous embodiments, comprising the following steps:

determining the force acting on the respective support portions of the transport device by means of the force measuring devices, transmitting the determined forces to the control unit by means of the communication device, comparing the determined forces by means of the control unit, and lifting or lowering one or more of the support portions by means of the lifting devices on the basis of the comparison and at the instigation of the control unit.

This implementation of the invention is used when an object is lifted and transported by a plurality of transport devices. If it is determined that the force acting on a support portion of a first transport device deviates significantly from the force acting on the support portion of a second or third transport device, this can be seen as an indication that the weight of the object is distributed unevenly among the transport devices involved. The support portion of the first transport device is lowered, thereby avoiding excessive loads on one of the transport devices. The wear of the transport devices used also becomes more evenly distributed.

A variant of the present invention relates to a method for operating a driverless transport system according to one of the previous embodiments, comprising the following steps:

transporting an object by means of at least two transport devices, detecting the environment of the transport device with respect to selectable properties by means of a sensor unit, and lifting or lowering the support portions by means of the lifting devices on the basis of the detected properties of the environment.

As already mentioned, one of the selectable properties can be the evenness of the surface on which the transport devices travel. If unevenness is detected, such as bumps, which could lead to the transported object being able to touch the surface between the two transport devices, the support portions are lifted up in such a way that the object is prevented from touching the surface. This prevents disruptions in the operating process.

Exemplary embodiments of the invention are explained in more detail below with reference to the accompanying drawings. In the drawings:

FIG. 3B is an isolated view of a force measuring device according to a first exemplary embodiment, which device is integrated into the lifting device;

FIG. 7A is a perspective view of a fourth exemplary embodiment of the transport device according to the invention, which device has an expanding device;

FIG. 7B shows the expanding device of the transport device according to the invention according to the fourth embodiment in an isolated top view, where the expanding device is in a first position;

FIG. 7C shows the expanding device shown in FIG. 7B in a second position by means of a bottom-view;

Figure 1A:
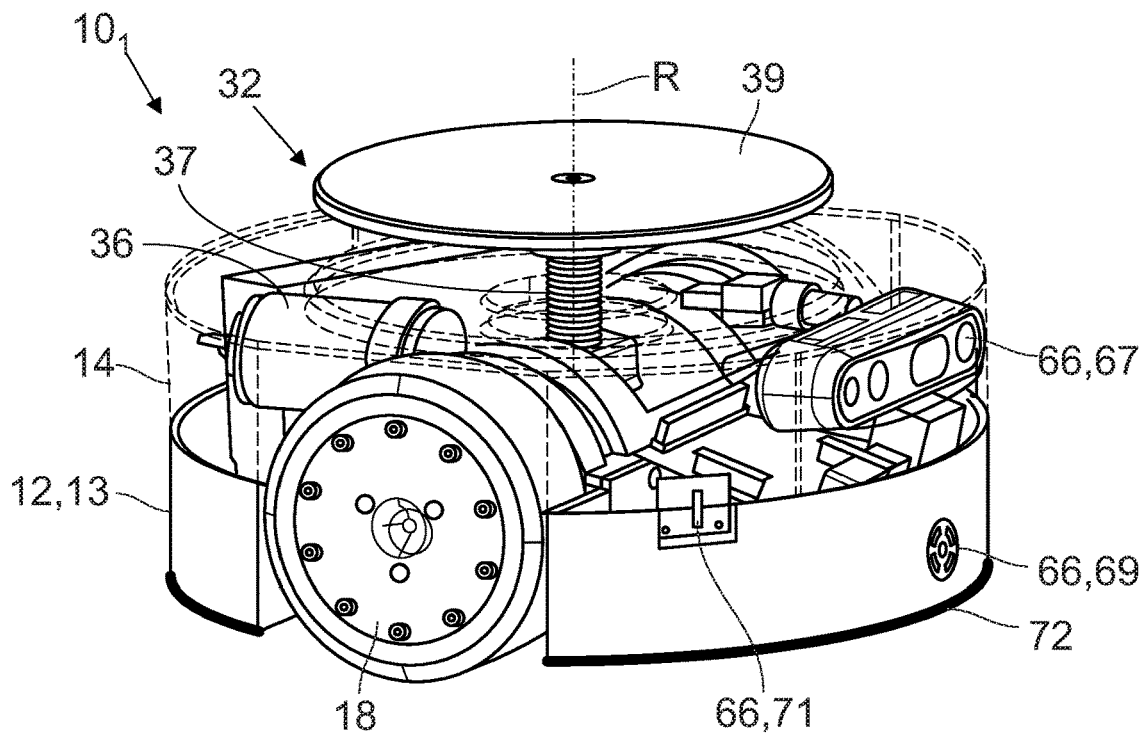
FIG. 1A is a perspective view of a first exemplary embodiment of a transport device according to the invention for transporting objects.
Figure 1B:
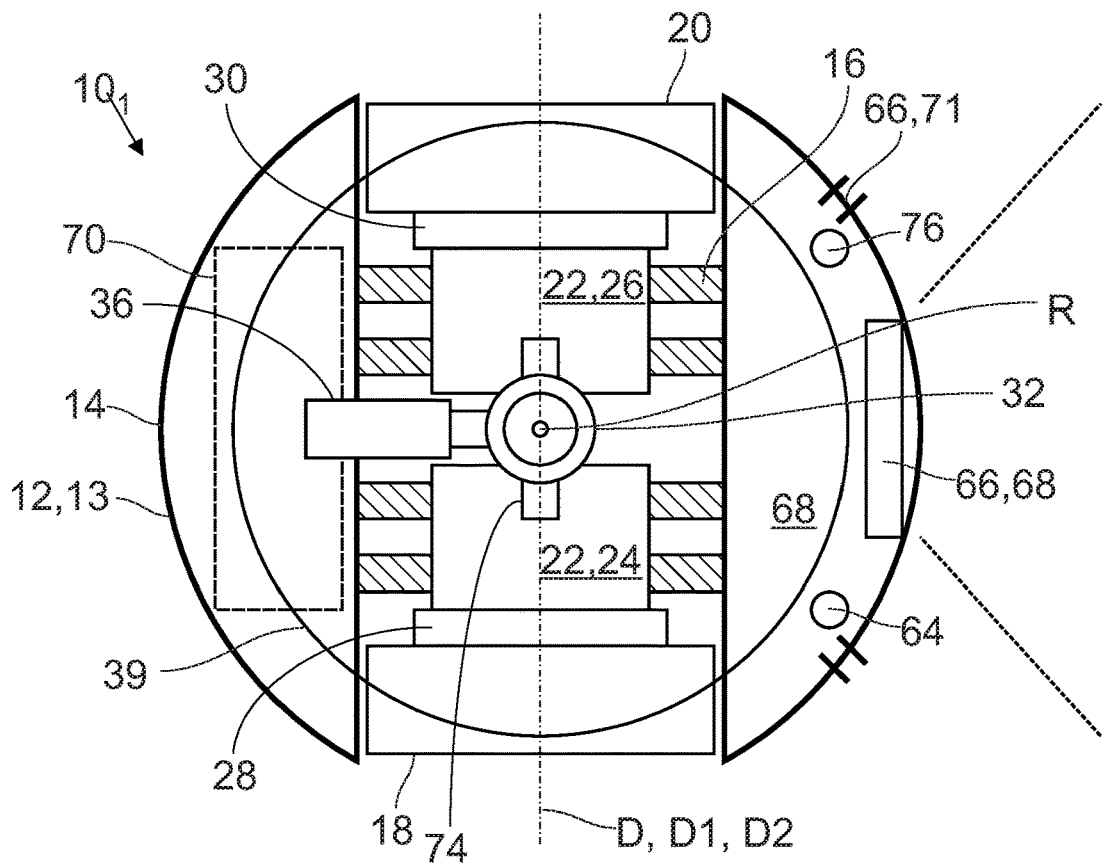
FIG. 1B is a basic and not-to-scale top view of the exemplary embodiment of the transport device shown in FIG. 1A.

A first exemplary embodiment of a transport device $10_1$ according to the present invention is shown in FIGS. 1A and 1B. FIG. 1A is a perspective view of the transport device $10_1$ while FIG. 1B is a top view of the transport device $10_1$ shown in FIG. 1A, with FIG. 1B not being to scale and being only of a basic nature.

The transport device $10_1$ has a support structure 12 which, in the present exemplary embodiment, is formed by a housing 13 which has an outer contour 14. The outer contour 14 designates the outer surfaces and edges of the support structure 12 or the housing 13. Secured to the support structure 12 is an undercarriage 16 in which a first wheel 18 and a second wheel 20 are mounted so as to rotate about an axis of rotation D1 and a second axis of rotation D2. In the illustrated exemplary embodiment, the first axis of rotation D1 and the second axis of rotation D2 coincide, thus creating a common axis of rotation D.

The transport device $10_1$ also comprises a drive unit 22 which is likewise attached to the support structure 12. In this case, the drive unit 22 has a first drive motor 24 and a second drive motor 26, the first drive motor 24 being arranged adjacent to the first wheel 18 and the second drive motor 26 being arranged adjacent to the second wheel 20. The first drive motor 24 is connected by means of a first transmission 28 to the first wheel 18 and the second drive motor 26 by means of a second transmission 30 to the second wheel 20, so that the rotational movement provided by the first drive motor 24 and the second drive motor 26 is directly transmitted to the first wheel 18 and the second wheel 20, respectively. The first drive motor 24 can be operated independently of the second drive motor 26, so that the first wheel 18 and the second wheel 20 can also be driven in different directions and at different speeds, as a result of which the transport device $10_1$ can be rotated.

Figure 3A:
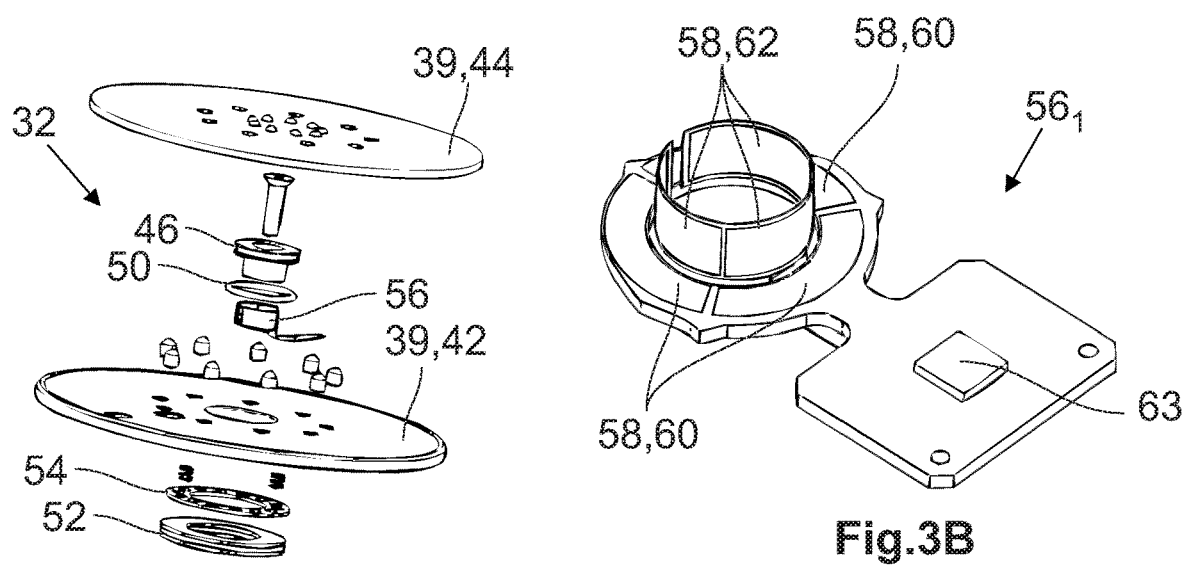
FIG. 3A is an isolated and perspective exploded view of a lifting device of the transport device.
Figure 3A:
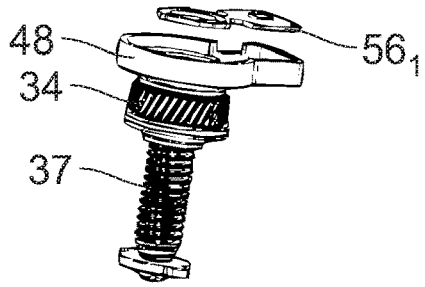

In addition, the transport device $10_1$ comprises a lifting device 32, which is shown separately in FIG. 3A. The lifting device 32 is provided with a spindle nut 34 which can be rotated about a rotational axis R by means of a third drive motor 36. The rotational axis R extends perpendicularly to the common axis of rotation D and vertically when the device is being used as intended. The spindle nut 34 interacts with a non-rotatable spindle 37, which in turn is connected to a support portion 39, which, in the first embodiment of the transport device $10_1$, is designed in the manner of a rotary plate that can rotate with respect to the housing 13. If the spindle nut 34 is rotated about the rotational axis R by means of the third drive motor 36, the spindle 37 and the support portion 39 connected thereto are moved along the rotational axis R. In relation to the intended use of the transport device $10_1$, which is the case when the first wheel 18 and the second wheel 20 are rolling on a surface (not shown in FIGS. 1A and 1B), the support portion 39 is either lifted or lowered depending on the direction of rotation of the third drive motor 36. In order to transport an object 38, for example a pallet 40 (see FIG. 5), the transport device $10_1$ is moved into a cavity in the pallet 40 and then the lifting device 32 is activated in such a way that the support portion 39 is lifted up. The support portion 39 is consequently brought into contact with the pallet 40, which is consequently lifted up so that it is no longer in contact with the surface. The pallet 40 can then be brought to the desired location by means of the transport device $10_1$.

With reference to FIG. 3A, it can be seen that the support portion 39 of the lifting device 32 has a plate 42 and a studded mat 44 connected to the plate 42. The studded mat 44 can be glued to the plate 42, for example. The plate 42 is connected to the spindle 37 by means of a clamping sleeve 46. The clamping sleeve 46 also simultaneously secures a plate housing 48, which is open toward the plate 42, to the spindle 37. An O-ring 50 is placed in a circumferential groove in the clamping sleeve 46 and seals the clamping sleeve 46 with respect to the plate 42. A thrust roller bearing 52 is arranged in the plate housing 48, so that the support portion 39 can rotate relative to the plate housing 48 and the rest of the transport device $10_1$. A rubber ring 54 is arranged between the thrust roller bearing 52 and the plate 42. The rubber ring 54 allows tilting movements between the plate 42 and the thrust roller bearing 52, which are caused by the support portion 39 being unevenly loaded.

In addition, a force measuring device $56_1$ according to a first exemplary embodiment is arranged in the plate housing 48 and is shown separately in FIG. 3B. In the first exemplary embodiment, the force measuring device $56_1$ comprises a total of six capacitive force sensors 58, which can be divided into a first group 60 and a second group 62, each group having three force sensors 58. In relation to the intended use of the transport device $10_1$, the main surfaces of the force sensors 58 of the first group 60 lie in a horizontal plane while the main surfaces of the force sensors 58 of the second group 62 are oriented perpendicularly to the main surfaces of the force sensors 58 of the first group 60. The force sensors 58 of the first group 60 are in the shape of circle ring segments, while the force sensors of the second group 62 are in the shape of cylinder segments. The main surfaces of the force sensors 58 of the second group 62 lie in a vertical plane when the transport device $10_1$ is used as intended. Instead of the capacitive force sensors 58, resistive force sensors, strain gauges, or a printed electronics system can also be used.

Figure 3C:
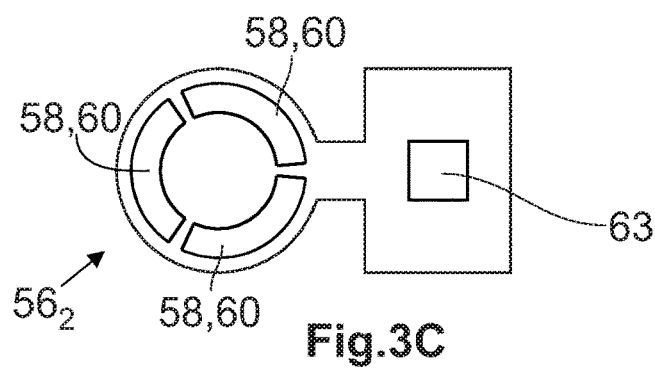
FIG. 3C is an isolated view of a force measuring device according to a second exemplary embodiment, which device is integrated into the lifting device.

FIG. 3C shows a second exemplary embodiment of the force measuring device $56_2$, which differs substantially from the force measuring device $56_1$ according to the first exemplary embodiment in that it has only three capacitive force sensors 58, which can be assigned to the first group 60.

In both cases, it is possible to measure forces acting horizontally and forces acting vertically. In addition—depending on how the force sensors 58 are mechanically mounted—tilting, rotating, and sliding movements can be measured.

In the first exemplary embodiment of the force measuring device $56_1$, the force sensors 58 of the first group 60 are used to determine vertically acting forces. The force sensors 58 of the second group 62 are used to determine horizontally acting forces. On the basis of the division of the force sensors 58 into the first group 60 and the second group 62, the different load cases can be distinguished from one another more precisely than is the case with the second exemplary embodiment of the force measuring device 562. Since, in principle, the greater the number of force sensors 58, the better the various load cases can be described, the aim is to increase the number of force sensors 58. However, this increases the space requirement. Arranging the force sensors 58 of the first group 60 perpendicularly to the force sensors 58 of the second group 62 increases the accuracy with which the load cases can be described. In addition, the installation space required for this purpose is kept within reasonable limits.

The force sensors 58 interact with an evaluation unit 63 in such a way that the forces acting on the support portion 39 can be determined. In addition, the evaluation unit 63 can determine how the forces are distributed over the support portion 39. On the basis of the degrees of freedom predetermined by the mounting of the support portion 39 in the lifting device 32, certain load cases to be determined, for example tilting, can be specified. In addition, the loads that can be determined depend on the arrangement of the force sensors 58 relative to the support portion 39.

The information of the size and distribution of the forces acting on the support portion 39 can be used in various ways; these will be discussed in more detail below. At this point it need only be pointed out that overloading the transport device $10_1$ can be prevented. If the force acting on the support portion 39 exceeds a specific amount, the lifting of the support portion 39 can be interrupted and a corresponding warning signal can be output by means of a signal generator 64 (see FIG. 1B). The warning signal can be output, for example, in optical and/or acoustic form.

With reference to FIGS. 1A and 1B, the transport device $10_1$ has a sensor unit 66 by means of which the environment of the transport device $10_1$ can be detected. In particular, it is possible to determine obstacles as well as the nature of the surface on which the wheels are rolling. The sensor unit 66 can comprise cameras 67, ultrasonic sensors 69, laser-based sensors 71, or radar-based sensors or the like, by means of which the environment can be detected with sufficient accuracy even under different conditions. The sensor unit 66 is arranged in a sensor portion 68 which is delimited by the outer contour 14 and by the common axis of rotation D or by a plane extending through the common axis of rotation D and the rotational axis R. According to this definition, the transport device $10_1$ has two such sensor portions 68, but the sensor unit 66 is arranged in only one of said sensor portions 68. As a result of this arrangement, the sensor unit 66 can detect only the part of the environment that is located on the side of the common rotational axis D or the plane extending therethrough on which the sensor unit 66 is arranged.

In addition, the transport device $10_1$ is equipped with a storage unit 70 for electrical energy so that the relevant components can be supplied with electrical energy.

As can be seen in particular from FIG. 1B, the outer contour 14 is rotationally symmetrical to the rotational axis R, at least in portions. In addition, in particular the support portion 39 and the first wheel 18 and the second wheel 20 are arranged within the outer contour 14. Therefore, no components protrude radially beyond the outer contour 14. This results in the effect that, when the transport device $10_1$ rotates on the spot, which can be brought about by correspondingly controlling the first wheel 18 and the second wheel 20, there are no eccentric portions that could bump into adjacent objects and impair the rotation, as long as the adjacent objects are at a distance corresponding at least to the radius of the outer contour 14 about the rotational axis R.

It can be seen from FIG. 1A that a bristle portion 72 is arranged at the lower edge of the housing 13, which portion consists of a plurality of bristles that are not explicitly visible here. As mentioned, the first wheel 18 and the second wheel 20 are arranged on a common axis of rotation D. Consequently, the transport device $10_1$ can tilt about the common axis of rotation D such that the housing 13 rests on the surface on one side of the common axis of rotation D and, when the transport device $10_1$ is moved, drags along the surface. This dragging is prevented by the bristle portion 72, which also has a stabilizing effect on the transport device $10_1$. Furthermore, the bristle portion 72 has the effect of a broom, so that at least relatively small particles are removed and cannot negatively affect the rolling of the wheels 18, 20 on the surface.

In order to stabilize the transport device $10_1$ about the common axis of rotation D, one or more support wheels (not shown) can alternatively also be used.

In the illustrated exemplary embodiment, the transport device $10_1$ is also equipped with a self-stabilizing device 74 (FIG. 1B), which can determine the inclination and the change in inclination of the transport device $10_1$ about the common axis of rotation D and can counteract it. For example, the self-stabilizing device 74 can have a gyroscope or a tilt sensor. If the self-stabilizing device 74 determines that the inclination about the common axis of rotation D exceeds a critical level, the self-stabilizing device 74 can initiate countermeasures. The countermeasures can consist of, for example, targeted acceleration or deceleration of the first wheel 18 and/or of the second wheel 20. Alternatively, a counterbalancing shaft (not shown here) can be driven or weights (also not shown here) can be shifted. All measures serve to generate a torque which counteracts the inclination about the rotational axis D within the transport device $10_1$ in order to reduce the inclination back to values below the critical level. It should be noted that the self-stabilizing device 74 can only be used if no objects are being transported by the transport device $10_1$.

In addition, the transport device $10_1$ is equipped with a communication device 76 by means of which the transport device $10_1$ can exchange information with other communication partners; these will be discussed in more detail below.

Figure 2:
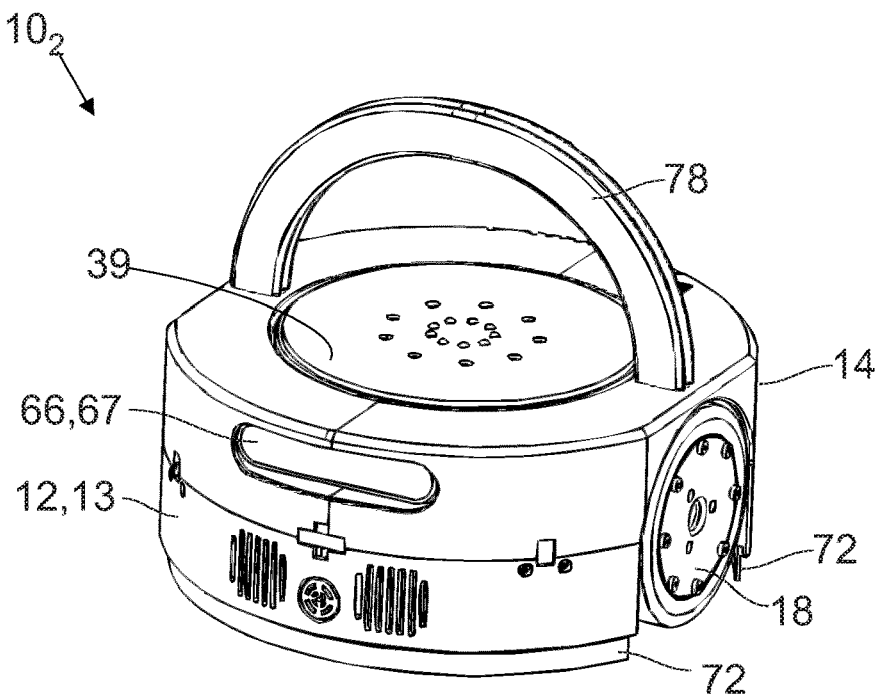
FIG. 2 is a perspective view of a second exemplary embodiment of the transport device according to the invention.

FIG. 2 shows a perspective representation of a second exemplary embodiment of the transport device $10_2$ according to the invention. The transport device $10_2$ according to the second exemplary embodiment is largely of the same construction as the transport device $10_1$ according to the first exemplary embodiment. In addition, the transport device $10_2$ has a carrying handle 78 which is rotatably secured to the support structure 12. Consequently, the transport device $10_1$ can be gripped by the carrying handle 78 and transported in the manner of a bucket.

Figure 4:
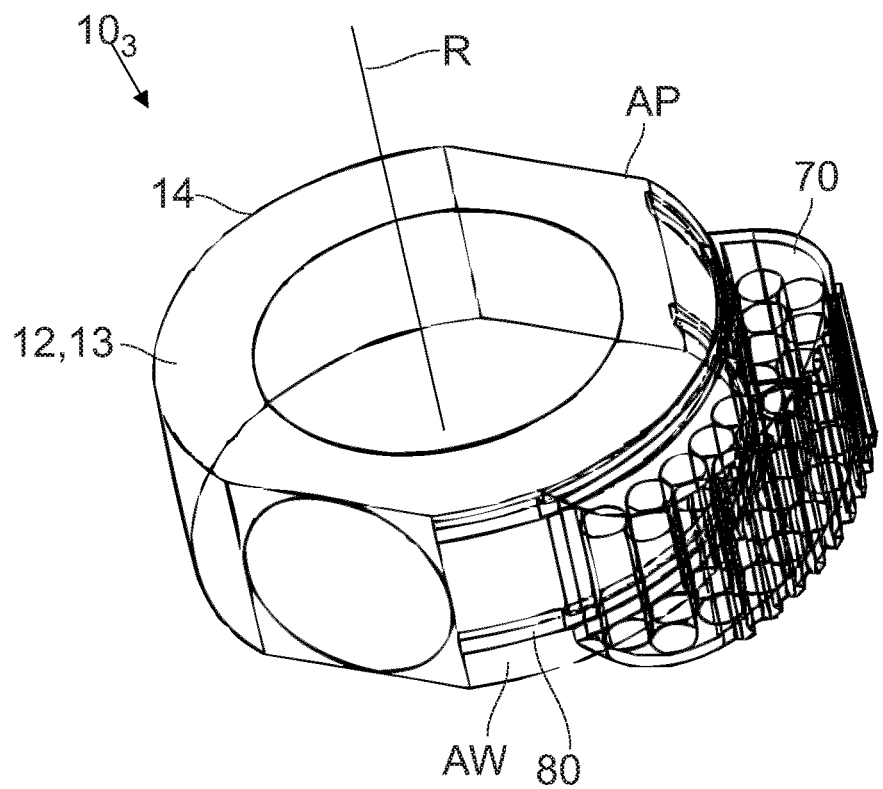
FIG. 4 is a basic view of a part of a support structure of the transport device according to the invention according to a third exemplary embodiment, in which a storage unit for electrical energy is movably secured to the support structure.

FIG. 4 is a basic and perspective view of a part of a support structure 12 of the transport device $10_3$ according to the invention according to a third exemplary embodiment, in which the support structure 12 is designed as a housing 13. There are two circular-ring-shaped grooves 80 in one of the two curved outer surfaces AW of the housing 13, into which grooves a storage unit 70 for electrical energy can engage interlockingly and be detachably connected to the housing 13. In this exemplary embodiment, the storage unit 70 is therefore arranged in the manner of a backpack outside the housing 13 and forms an eccentric portion. The storage unit 70 can be moved inside the two grooves 80 and rotates about the rotational axis R. The transport device $10_1$ can therefore be moved on the spot within certain limits in spaces that are only marginally wider than the housing 13 at the two flat outer surfaces AP. Such spaces can be the cavities in pallets 40. During rotation, the storage unit 70 strikes the walls of the pallet 40 and rotates about the rotational axis R of the transport device $10_1$ along the grooves 80 due to the rotational movement of the transport device $10_1$. The storage unit 70 does not hinder the further rotation of the transport device $10_1$.

Figure 5:
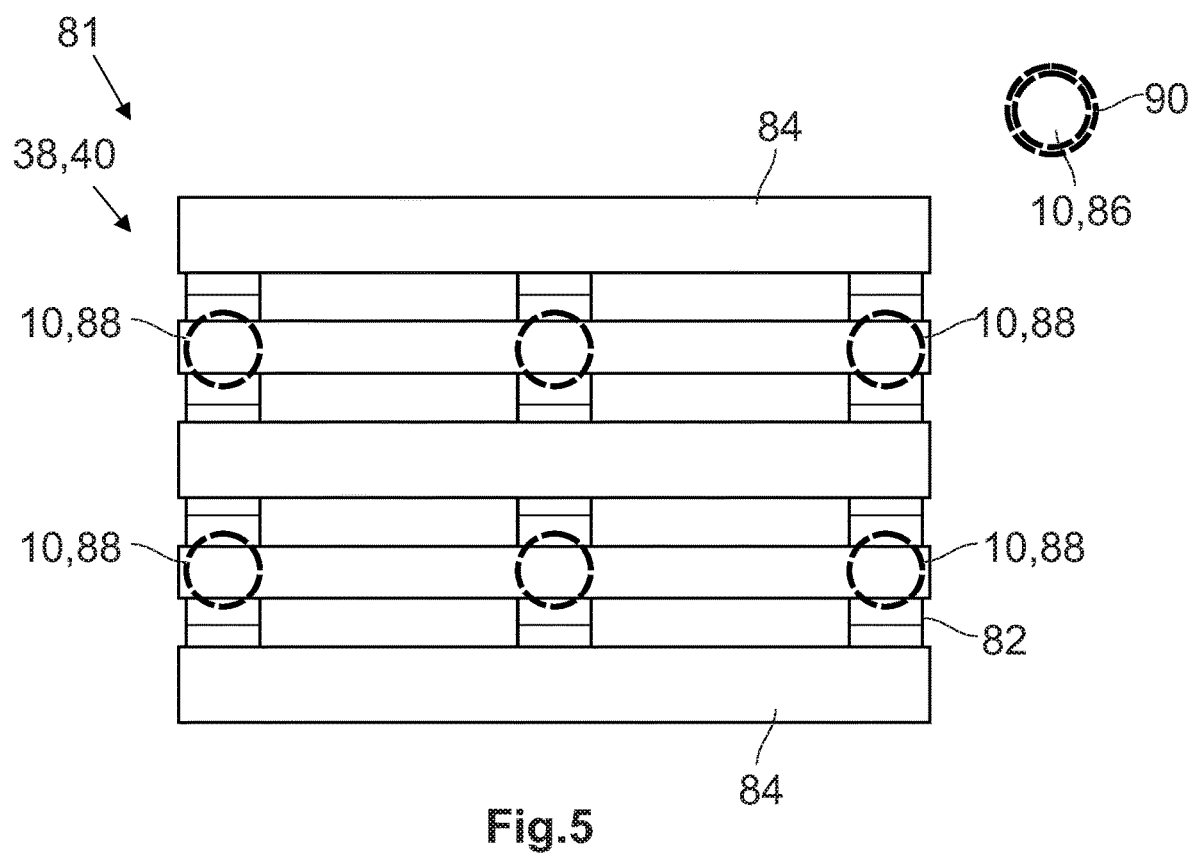
FIG. 5 is a top view of an object which is being transported by a transport system.

FIG. 5 is a top view of an object 38 which can be transported by means of a transport system 81 according to the present invention. In FIG. 5, the object 38 is designed as a pallet 40 on which objects (not shown in more detail) such as crates or the like can be placed. The illustrated pallet 40 has three crosspieces 82 onto which a total of five boards 84 are nailed. In each crosspiece 82 there are two recesses (not visible in FIG. 5), each of which aligns with the recesses in the adjacent crosspieces 82.

The transport system 81 comprises a total of seven transport devices 10, which are described in FIGS. 1A and 1B and are only shown in a basic way in FIG. 5. Six of the transport devices 10 are each moved into one of the respective recesses in the crosspieces 82. The lifting device 32 is then lifted up so that the pallet 40 can be removed from the surface and then transported to the desired location. As can also be seen from FIG. 5, a seventh transport device $10_1$ is not introduced into the recesses in the pallet 40. The seventh transport device $10_1$ is configured as a so-called master 86, while the other six transport devices 10 are designed as slaves 88. The master 86 is used in particular to detect the environment, since it is positioned outside the pallet 40 and can therefore, in contrast to the slaves 88, better identify the environment. Using the communication device 76, the master 86 can transmit commands to the slaves 88, in particular with regard to obstacles.

The master 86 accompanies the slaves 88 until the pallet 40 has been transported to the desired location. The lifting device 32 is then activated accordingly such that the pallet 40 is placed back on the surface. The slaves 88 then move out of the pallet 40 and can be used to transport a further object. The seven transport devices 10 can be identical in terms of design. However, it is also possible to provide the master 86 with a particularly powerful master sensor unit 90 so that the environment can be detected over a particularly large area.

In the event that the transport devices 10 are of identical design, each of the transport devices 10 can be defined as a master 86 or a slave 88. The transport devices 10 can therefore be used differently. As mentioned, the master 86 is used to detect the environment of the pallet 40 as extensively as possible. For this purpose, the sensor unit 66 requires an above-average amount of electrical energy. The possibility of also using one of the other transport devices 10 as the master 86 prevents the storage unit 70 of a transport device $10_1$ from emptying more quickly than that of the other transport devices 10. Additionally, all the transport devices 10 are evenly loaded, which prevents one or more of the transport devices 10 from wearing out faster and having to be serviced sooner than others. For transporting the further object 38, another of the transport devices 10 can be used as the master 86.

Figure 6A:
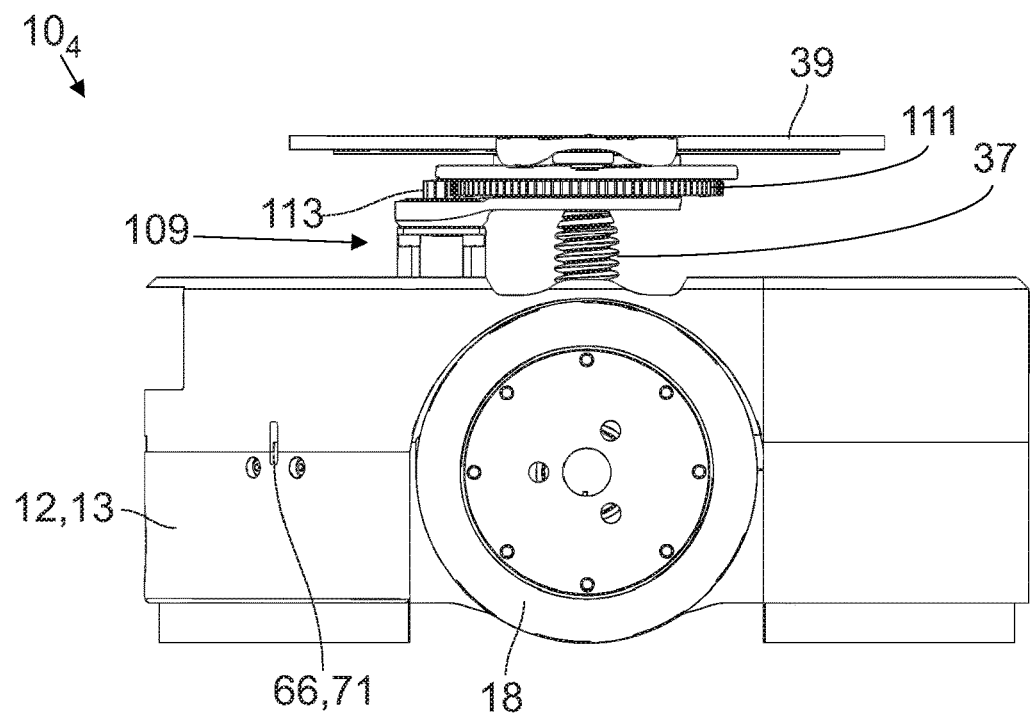
FIG. 6A is a side view of a third exemplary embodiment of the transport device according to the invention, which device has an expanding device.
Figure 6B:
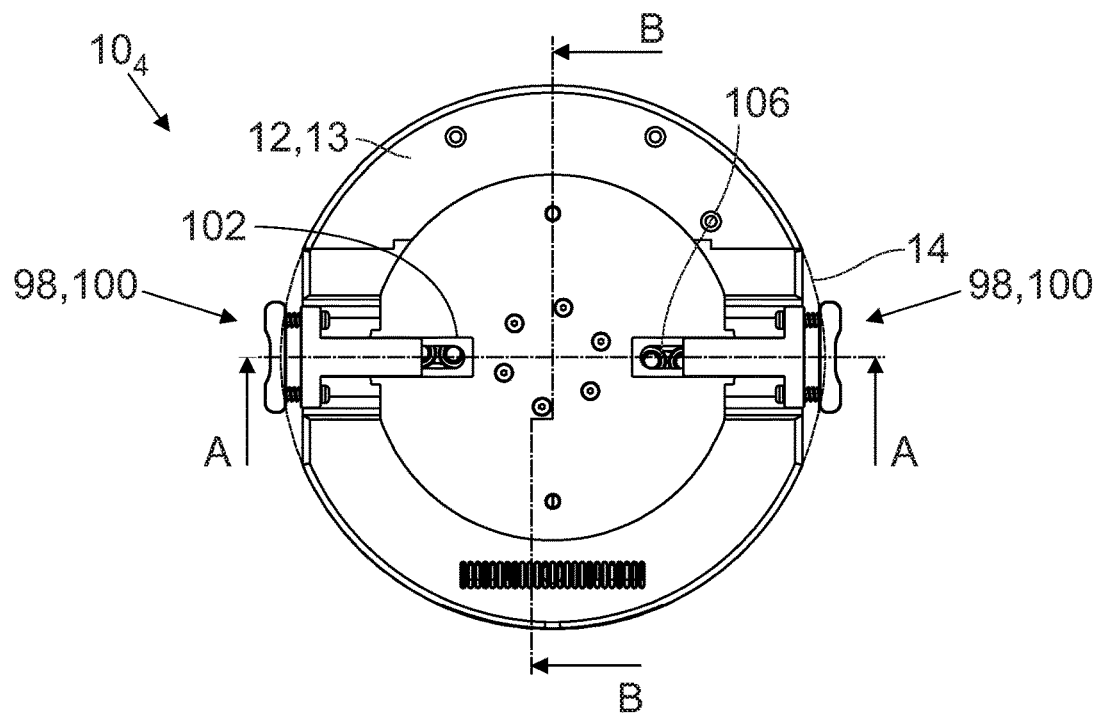
FIG. 6B is a top view of the third exemplary embodiment of the transport device according to the invention shown in FIG. 6A.
Figure 6C:
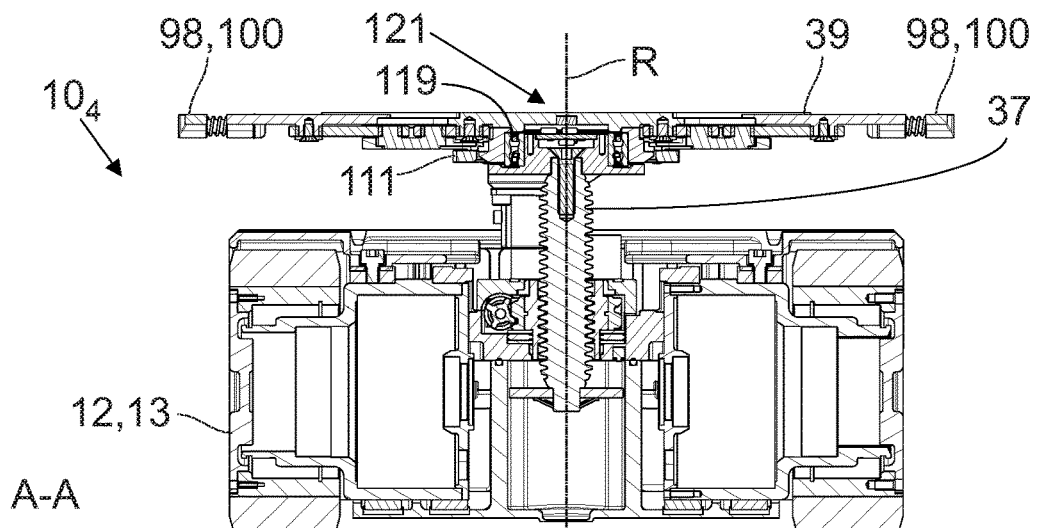
FIG. 6C is a sectional view through the third exemplary embodiment of the transport device along the sectional plane A-A defined in FIG. 6B.
Figure 6D:
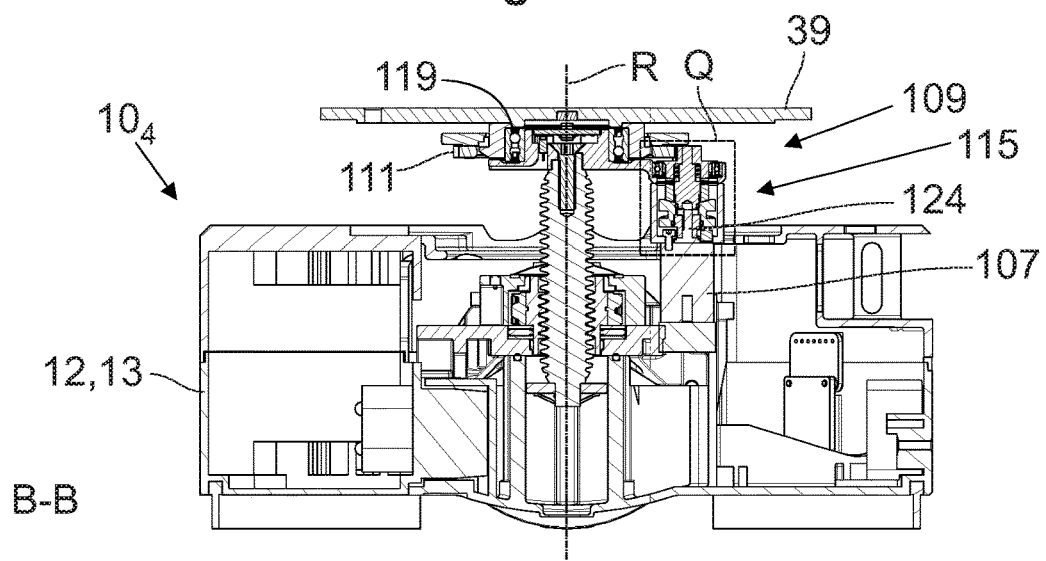
FIG. 6D is a sectional view through the third exemplary embodiment of the transport device along the sectional plane B-B defined in FIG. 6B.
Figure 6E:
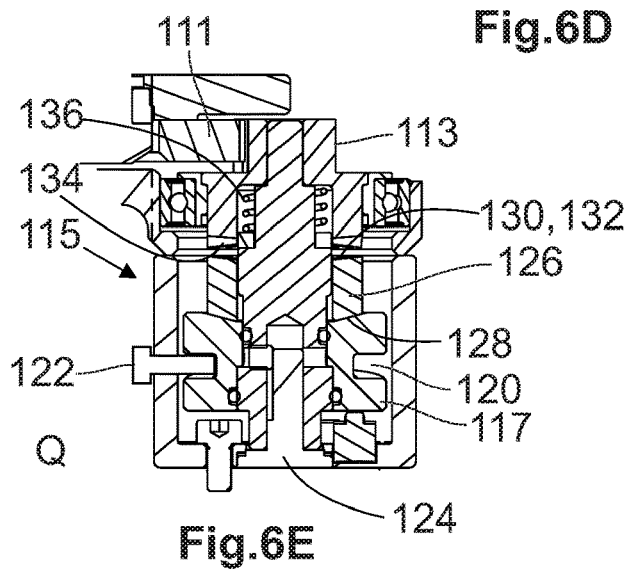
FIG. 6E is an enlarged view of the detail Q marked in FIG. 6D.

FIG. 6A is a side view showing a fourth exemplary embodiment of the proposed transport device 104 and FIG. 6B is a top view thereof. FIGS. 6C to 6E are sectional views of a fourth exemplary embodiment of the proposed transport device $10_4$. The basic design of the transport device $10_4$ according to the fourth exemplary embodiment largely corresponds to that of the above-described exemplary embodiments, and therefore only the differences will be discussed below.

The transport device $10_4$ according to the fourth exemplary embodiment comprises an expanding device 98 which, in the fourth exemplary embodiment of the transport device $10_4$, comprises two expanding arms 100 which can be adjusted between a first position and a second position by means of an adjusting unit 106. In FIG. 6B, the two expanding arms 100 are shown in a second position, in which the expanding arms 100 protrude beyond the outer contour 14 of the support structure 12. In the first position (not shown) the expanding arms 100 are located within the outer contour 14, such that, when the transport device $10_4$ rotates on the spot, there are no eccentric portions that bump into adjacent objects 38 and could therefore hinder the rotation. The expanding arms 100 are movably mounted in guideways 102, the guideways 102 being formed by grooves in the support portion 39. Starting from the center of the transport device $10_4$, the guideways 102 extend radially outward, such that the expanding arms 100 can be moved in a radial direction.

In order to move the expanding arms 100 between the first and the second position, the expanding device 98 comprises, in addition to the adjusting unit 106, a further drive unit 107 which will be described in more detail below, in particular with reference to FIGS. 6C to 6E. The adjusting unit 106 and the further drive unit 107 interact using a drive train 109. The drive train 109 extends eccentrically to the axis of rotation R and comprises a first gear 111 and a second gear 113, which mesh with one another, as can be seen in particular from FIG. 6A. The first gear 111 is connected to the support portion 39 for conjoint rotation. As a result, the rotational movement of the further drive unit 107 can be transmitted to the adjusting unit 106. By means of the rotational movement, the expanding arms 100 can be moved between the first position and the second position. The mechanisms used for this purpose will be discussed in more detail below.

As mentioned above, the spindle 37 is mounted in the support structure 12 for conjoint rotation. To be able to move the support portion 39 and consequently also the expanding device 98 relative to the housing 13, a corresponding bearing unit 119 is provided. To be able to determine the rotational position of the spreading device 98, for example in relation to the first axis of rotation D1 and/or the second axis of rotation D2, an angle sensor 121 is provided.

The drive train 109 contains a decoupling unit 115 with which the drive train 109 can optionally be opened and closed. The decoupling unit 115 has the following purpose: The expanding arms 100 are used to clamp the transport device 104 in the second position with the object 38 to be transported, in particular with a pallet 40 (see FIG. 5), in order to prevent uncontrolled slipping. However, it would then not be possible to easily rotate the transport device $10_4$ in the clamped state, in particular for steering, since otherwise the resistances present in the drive train 109 and in the further drive unit 107 would have to be overcome.

Figure 6F:
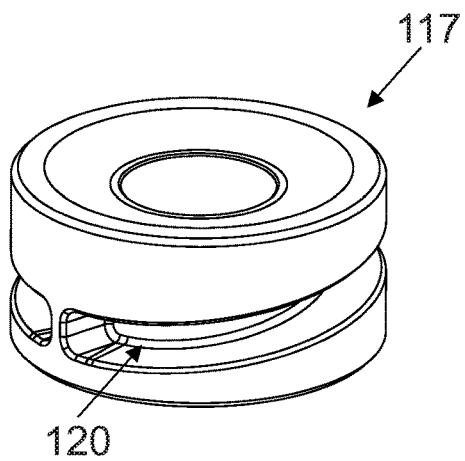
FIG. 6F is an isolated view of an actuator of a decoupling unit.

The decoupling unit 115 comprises a cam disk 117, which is shown separately in FIG. 6F. The cam disk 117 is connected to an output shaft 124 of the further drive unit 107 for conjoint rotation but also in an axially displaceable manner The lateral surface of the cam disk 117 has a groove 120 with a helical shape and a specific gradient. A pin 122 anchored in the support structure 12 protrudes into the groove 120 (FIG. 6E). If the cam disk 117 is rotated by the output shaft 124, the cam disk also carries out, in addition to the rotational movement, a translational movement in parallel with the rotational axis R. The translational movement of the cam disk 117 is transmitted to a coupling element 126 which is annular. To this end, the coupling element 126 comes into contact with the cam disk 117 via a first end face 128. On a second end face 130, the coupling element 126 has a first serration 132 which, depending on the position, can engage a corresponding second serration 134 of the second gear 113. In the operating state shown in FIG. 6E, the first serration 132 and the second serration 134 are not in engagement. If the first serration 132 and the second serration 134 are engaged, the rotational movement of the output shaft 124 of the further drive unit 107 is transmitted to the first gear 111, as a result of which the expanding arms 100 are moved. Depending on the direction of rotation of the output shaft 124, the coupling element 126 is moved from the cam disk 117 toward or away from the second gear 113. Accordingly, the first serration 132 and the second serration 134 can be brought into or out of engagement. In order to ensure the contact between the cam disk 117 and the coupling element 126, the coupling element 126 interacts with a return spring 136.

If, for example, the expanding arms 100 are moved from the second position into the first position, and the further drive unit 107 is rotated further in this direction after reaching the first position, this brings about a rotation of the support portion 39. In this way, the expanding device 98 and consequently the expanding arms 100 can be brought into any rotational position with respect to the support structure 12 or the housing 13. The rotational position can be determined with the angle sensor 121. This applies analogously when the expanding arms have reached the second position.

FIG. 7A is a perspective view of a fifth exemplary embodiment of the transport device $10_5$ according to the invention. The design of the transport device $10_5$ according to the fifth exemplary embodiment is largely similar to that of the fourth exemplary embodiment of the transport device $10_4$, in particular with regard to the design of the drive train 109 and the adjusting unit 106.

The expanding device 98 comprises a total of six expanding arms 100, which are located in a first position in FIG. 7B and in a second position in FIG. 7C. In FIG. 7A, too, the expanding arms 100 are in the first position. It can be seen that the expanding arms 100 do not protrude beyond the outer contour 14 of the support structure 12 when the expanding arms 100 are in the first position. As is also the case in the fourth exemplary embodiment of the transport device $10_4$, the expanding arms 100 are movably mounted in the guideways 102, the guideways 102 extending from grooves arranged in the support portion 39 such that the support portion 39 forms a corresponding number of circle segment elements 104 (see FIG. 7A). For reasons of presentation, the circle segment elements 104 are not shown in FIG. 7C.

Starting from the center of the transport device $10_4$, the guideways 102 extend radially outward such that the expanding arms 100 can likewise move in a radial direction, as can also be seen from a comparison of FIGS. 7B and FIG. 7C. The adjusting unit 106 comprises one toggle unit 108 per expanding arm 100, which unit can be extended or compressed by rotating a synchronization unit 110, which in the illustrated exemplary embodiment comprises a link disk 112. By extending the toggle unit 108 the expanding arms 100 are moved radially outwardly into the second position and by compressing the toggle unit 108 are moved into the first position. Since the link disk 112 interacts with all the toggle units 108 in the same way, all the expanding arms 100 are moved simultaneously when the link disk 112 is rotated.

The expanding device 98 comprises a blocking device 138, by means of which the adjusting unit 106 can be blocked at least when the expanding arms 100 are in the second position. In the fifth exemplary embodiment of the transport device, the blocking device 138 is realized in the following way: The link disk 112 interacts with the toggle units 108 in such a way that the two legs of the toggle units 108 are moved beyond an angle of 180° in the second position and are consequently pressed over and rest against a stop 140 in the second position. As a result, the expanding arms 100 are blocked in the second position without a blocking force having to be applied. As a result, it is possible to hold the expanding arms 100 in the second position even when the drive train 109 is open. In this respect, the blocking device 138 is largely formed by the adjusting unit 106 itself, so that no additional elements have to be provided for this purpose. Alternatively, however, the blocking device 138 can comprise one or more movable bolts or the like, by means of which the adjusting unit 138 can be blocked.

In addition, a stop element 114 is connected to the radially outer end of each expanding arm 100. As can be seen in particular from FIGS. 7A and 7B, in the first position the stop elements 114 strike the two adjacent stop elements 114. In addition, the stop elements 114 also strike the circle segment elements 104. As a result, the first position of the expanding arms 100 is clearly determined.

A support element 116 is movably secured to each of the stop elements 114, the support elements 116 being preloaded by means of a spring 118.

As shown in particular in FIG. 5, a pallet 40 can be transported, for example, by a total of six transport devices 10. If transport devices $10_4$, $10_5$ are used according to the fourth or fifth exemplary embodiment, the devices are moved into a cavity in the pallet 40 until they are located in the region of the above-mentioned crosspiece 82. In this case the expanding device 98 is in the first position.

Once the transport device $10_4$, $10_5$ has reached the desired position within the cavity, the lifting device is first activated, which causes the pallet 40 to be lifted up. Subsequently, the expanding device 98 is activated so that the expanding arms 100 are moved from the first position into the second position. In this case, the support elements 116 come into contact with the side walls of the cavity in the pallet 40, as a result of which the transport device $10_4$, $10_5$ is frictionally connected to the pallet 40. In this case, the springs 118 are compressed so as to prevent shock loads. In addition, the support elements 116 can be floatingly mounted so that manufacturing inaccuracies can be compensated for together with the springs 118. As a result, the transport device $10_4$, $10_5$ is oriented in a defined manner with respect to the pallet 40. Consequently, the pallet 40 can no longer shift with respect to the transport device $10_4$, $10_5$. The pallet 40 can now be moved to the desired destination by means of the transport device $10_5$.

As mentioned, the transport device $10_5$ according to the fifth exemplary embodiment differs from the transport device $10_4$ according to the fourth exemplary embodiment in particular in terms of the number of expanding arms 100. Owing to the higher number of expanding arms 100, it is possible to dispense with the use of the angle sensor 121, since the expanding device 98 can orient itself in such a way that the expanding arms 100 extend largely in parallel with the surface of the object 38 that is to be clamped by the transport device $10_4$.

Figure 8:
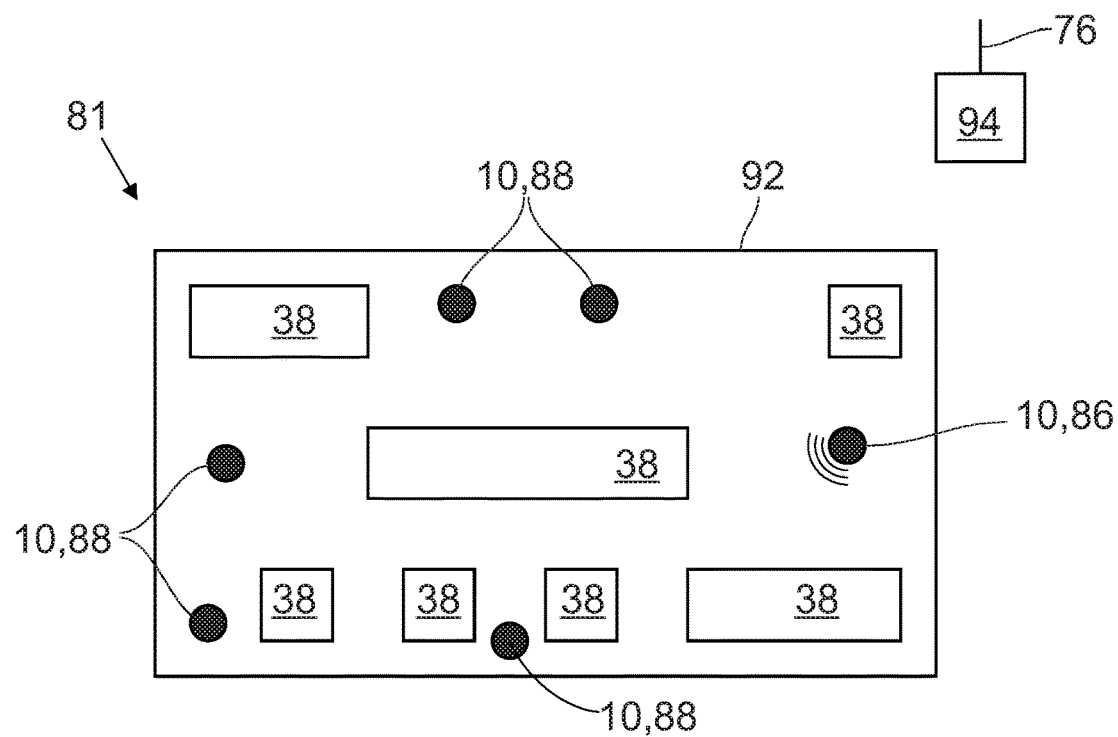
FIG. 8 shows a load area being loaded with a plurality of objects using a transport system.

FIG. 8 shows a transport system 81, which has a total of six transport devices 10 distributed within a workshop 92. Various objects are stored in the workshop 92 that are to be transported by means of the transport system 81. The transport system 81 comprises a control unit 94, by means of which the transport devices 10 can be controlled or regulated. As already mentioned, the transport devices 10 are equipped with communication devices 76 (see FIG. 1B), which enable mutual exchange of information. Additionally, the control unit 94 is equipped with a communication device 76 of this kind, so that not only can the transport devices 10 exchange information with one another, but also information can be exchanged between the transport devices 10 and the control unit 94. The control unit 94 can, for example, define tasks that are to be carried out by the transport devices 10. These tasks may consist of, for example, transporting the various objects 38 from one location to the destination location. As mentioned, the transport devices 10 are located within a workshop 92. The control unit 94 can be arranged outside the workshop 92, but an arrangement within the workshop 92 is also possible. To exchange information, the communication device 76 uses a wireless network, for example a WLAN or Bluetooth. Depending on the design and size of the objects, however, it is not always guaranteed that the WLAN is sufficiently available within the entire workshop 92. However, the functionality of the transport system depends on a sufficiently available WLAN. In order to stabilize the WLAN network, some or all of the transport devices 10 can be operated in the manner of a repeater or a relay station, so as to ensure that the WLAN is also available in the corners of the workshop 92 or behind or below the objects. As described in connection with FIG. 5, one or more of the transport devices 10 can be operated as a master 86. As also mentioned, the master 86 is used primarily to detect the environment around the object 38 to be transported, but the master 86 can also be positioned in such a way that the WLAN network is available at least for the slaves 88 assigned thereto.

Figure 9:
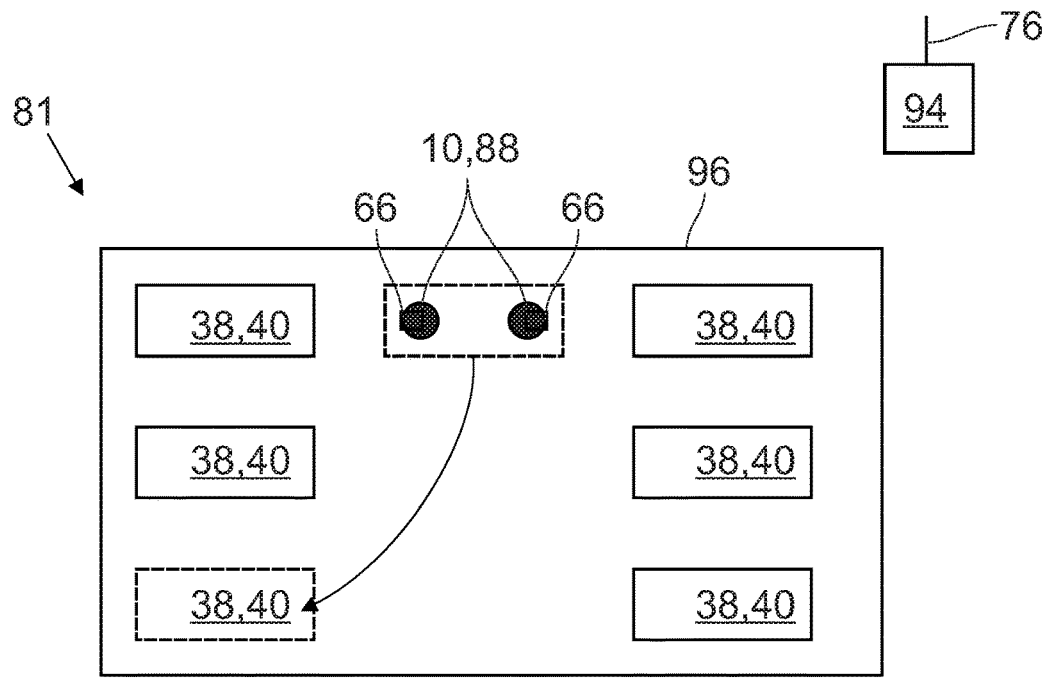
FIG. 9 shows a workshop in which a transport system is being used.

FIG. 9 shows a load area 96, for example that of a truck, which is loaded with the transport system 81 according to the invention. Due to the fact that the force acting on the support portion 39 of at least one transport device 10 according to one of the above-described exemplary embodiments can be determined by means of the force measuring device 56, this information can also be used to load the load area 96 of the truck as evenly as possible. In the example shown in FIG. 9, the load area 96 is to be loaded with a total of six pallets 40, which are to have the same weight; however, the transport system 81 cannot initially assume this. Firstly, the transport system 81 places a total of three pallets 40 side by side in a first row and registers the exact positions and the weight of the respective pallets 40 on the load area 96. Subsequently, the transport device 10₁ transports a fourth pallet 40 into a second row and finally a fifth and a sixth pallet 40 into a third row. After the sixth and final pallet 40 has also been transported to the load area 96, the transport system 81 receives information that no further pallets 40 are to be loaded onto the load area 96. The transport system 81 determines that the load area 96 is loaded unevenly. The transport system 81 changes the position of the fourth load area 96 in such a way that the load area 96 is now evenly loaded. The position of the fourth load area 96 is changed as indicated by the arrow.

As mentioned, the transport devices 10 each have a signal generator 64 (see FIG. 1B). The signal generator 64 can output a warning signal when the pallets 40 are so heavy that the maximum load of the transport devices 10 in question is exceeded. The exceeding of the maximum load can be detected by means of the force measuring device 56.

Furthermore, it can be seen from FIG. 9 that the sensor units 66 of the transport devices 10 are oriented in opposite directions. One of the transport devices 10 detects the environment on one side of the pallet 40, while the other of the transport devices 10 detects the environment on the other side of the pallet 40.

LIST OF REFERENCE NUMERALS

10 Transport device
10₁-10₅ Transport device
12 Support structure
13 Housing
14 Outer contour
16 Undercarriage
18 First wheel
20 Second wheel
22 Drive unit
24 First drive motor
26 Second drive motor
28 First transmission
30 Second transmission
32 Lifting device
34 Spindle nut
36 Third drive motor
37 Spindle
38 Object
39 Support portion
40 Pallet
42 Plate
44 Studded mat
46 Clamping sleeve
48 Plate housing
50 O-ring
52 Thrust roller bearing
54 Rubber ring
56 Force measuring device
58 Force sensors
60 First group
62 Second group
63 Evaluation unit
64 Signal generator
66 Sensor unit
67 Camera
68 Sensor portion
69 Ultrasonic sensor
70 Storage unit
71 Laser-based sensor
72 Bristle portion
74 Self-stabilization device
76 Communication device
78 Carrying handle
80 Groove
81 Transport system
82 Crosspiece
84 Board
86 Master
88 Slave
90 Master sensor unit
92 Workshop
94 Control unit
96 Load area
98 Expanding device
100 Expanding arm
102 Guideway
104 Circle segment element
106 Adjusting unit
107 Further drive unit
108 Toggle unit
109 Drive train
110 Synchronization unit
111 First gear
112 Link disk
113 Second gear
114 Stop element
115 Decoupling unit
116 Support element
117 Cam disk
118 Spring
119 Bearing unit
120 Groove
121 Angle sensor
122 Pin
124 Output shaft
126 Coupling unit
128 First end face
130 Second end face
132 First serration
134 Second serration
136 Return spring
138 Blocking device
140 Stop
AP Flat outer surface
AW Curved outer surface
D Common axis of rotation
D1 First axis of rotation
D2 Second axis of rotation
R Rotational axis

The invention claimed is:

1. A driverless transport device (10) for transporting objects (38), comprising:
   a support structure (12) having an outer contour (14);
   an undercarriage (16) which is secured to the support structure (12) and has at least one first wheel (18) and a second wheel (20), wherein the first wheel (18) is mounted in the undercarriage (16) so as to rotate about a first axis of rotation (D1) and the second wheel (20) is mounted in the undercarriage (16) so as to rotate about a second axis of rotation (D2);
   a drive unit (22) by means of which the first wheel (18) and the second wheel (20) can be driven independently of each other; and
   a force measuring device (56) by means of which a force acting on the support portion (39) can be determined, wherein the force measuring device (56) has at least two force sensors (58),
   wherein at least one first force sensor of the at least two force sensors (58) is assigned to a first group (60) and at least one second force sensor of the at least two force sensors (58) is assigned to a second group (62), and
   wherein the at least one first force sensor of the first group (60) is arranged perpendicular to the at least one second force sensor of the second group (62), such that a main surface of the at least one first sensor of the first group (60) lies in a horizontal plane and a main surface of the at least one second force sensor of the second group (62) extends vertically, the horizontal plane being parallel to ground.

2. The driverless transport device (10) according to claim 1, characterized in that the force measuring device (56) has at least one force sensor (58), which is designed as a capacitive force sensor, a resistive force sensor, as a strain gauge, or as a printed electronics system.

3. The driverless transport device (10) according to claim 1, characterized in that the driverless transport device (10) comprises a lifting device (32) which interacts with the support structure (12) for lifting and lowering at least one support portion (39), which interacts with the objects in order to transport same.

4. The driverless transport device (10) according to claim 3,
   wherein the outer contour (14) of the support structure (12) is substantially rotationally symmetrical about a rotational axis (R) in the top view, and
   wherein the at least one support portion (39) and/or the first wheel (18) and the second wheel (20) are arranged within the outer contour (14) or are flush with the outer contour (14).

5. The driverless transport device (10) according to claim 1, characterized in that the transport device (10) has a storage unit (70) for electrical energy which, in the top view, protrudes in portions beyond the outer contour (14) of the support structure (12), the storage unit (70) being movably secured to the support structure (12).

6. The driverless transport device (10) according to claim 5, characterized in that the storage unit (70) is secured to the support structure (12) so as to rotate about the rotational axis (R).

7. A method for operating the driverless transport device (10) according to claim 1, comprising the following steps:
   defining a load area (96) which is to be loaded with a plurality of objects (38) by means of the driverless transport device (10);
   transporting a first object (38) onto the load area (96);
   determining the first force acting on the support portion (39) by means of the force measuring device (56);
   placing the first object (38) at a first position of the load area (96);
   transporting a second object (38) onto the load area (96);
   determining the second force acting on the support portion (39) by means of the force measuring device (56); and
   placing the second object (38) at a second position of the load area (96), wherein the second position is selected on the basis of the first force and the second force in such a way that the load area (96) is loaded evenly.

8. The method according to claim 7, further comprising changing the first position and/or the second position in order to even out the loading of the load area (96).

9. The method according to claim 7, further comprising the following steps:
   defining a maximum load for the load area (96); and
   outputting a warning signal by means of the signal generator (64) when the defined maximum load is reached or exceeded.

10. A driverless transport system (81), comprising:
    a plurality of the driverless transport devices (10) according to claim 1;
    a control unit (94) for controlling or regulating the driverless transport devices (10); and
    a communication device (76) by means of which information can be exchanged between the control unit (94) and the driverless transport devices (10).

11. The driverless transport system (81) according to claim 10,
    wherein one of the driverless transport devices (10) is designed as a master (86) and the other driverless transport devices (10) are designed as slaves (88),
    wherein the master (86) has a master sensor unit (90) for detecting the environment of the master (86), and
    wherein the master (86) transmits information relating to the environment of the master (86) to the control unit (94) and/or to the slaves (88).

12. The driverless transport system (81) according to claim 11,
    wherein each of the transport devices (10) has a sensor unit (66) for detecting the environment of the transport device (10),
    wherein the sensor unit (66) being arranged in a sensor portion (68) delimited by the outer contour (14) and the first axis of rotation (D1) or the second axis of rotation (D2), and
    wherein the sensor unit (66) is designed in such a way that it only detects the part of the environment on the side of the first axis of rotation (D1) or the second axis of rotation (D2) on which the sensor unit (66) is arranged, and
    wherein at least a first of the sensor units being oriented in a first direction and at least a second of the sensor units being oriented in a second direction.

13. A method for operating the driverless transport system (81) according to claim 10, comprising the following steps:
    determining the force acting on the respective support portions (39) of the transport device (10) by means of the force measuring devices (56);
    transmitting the determined forces to the control unit (94) by means of the communication device (76);
    comparing the determined forces by means of the control unit (94); and lifting or lowering one or more of the support portions (39) by means of the lifting devices (32) on the basis of the comparison and at the instigation of the control unit (94).

\* \* \* \* \*